Sept. 16, 1969     R. D. VANEK     3,466,760
EDUCATIONAL ELECTRICAL CIRCUIT TOY
Filed Aug. 8, 1966
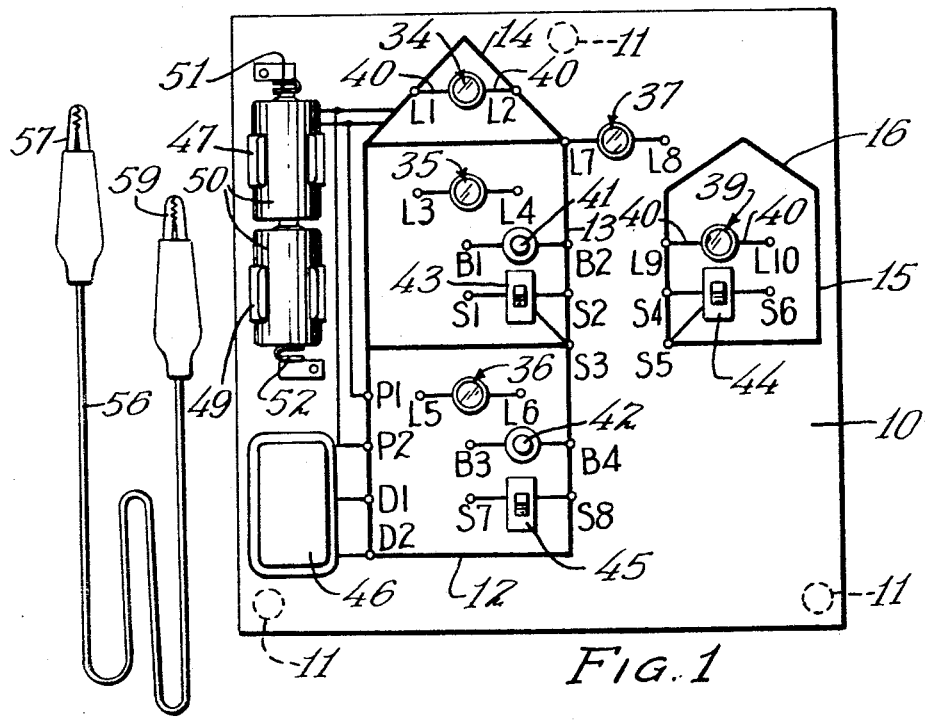
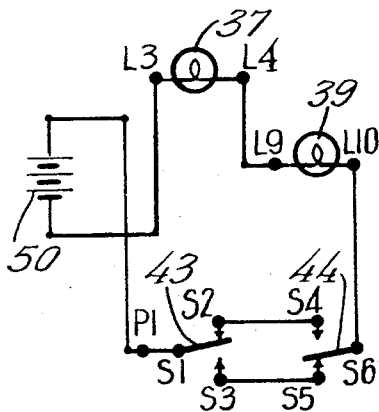
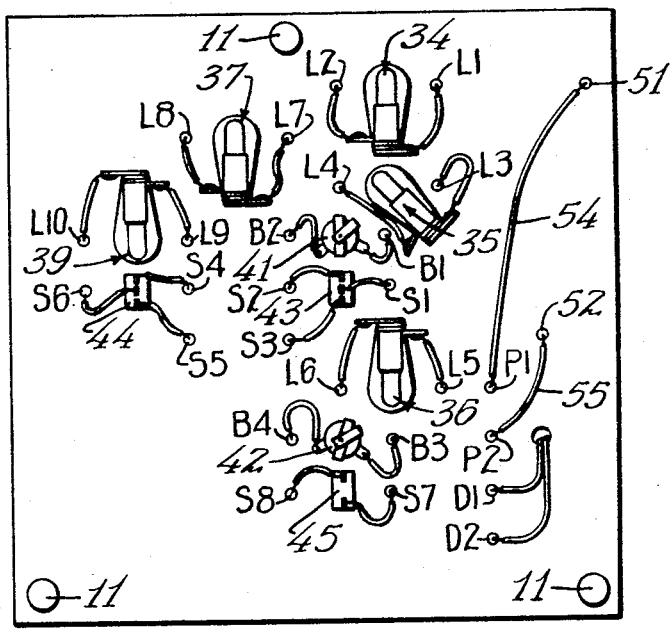
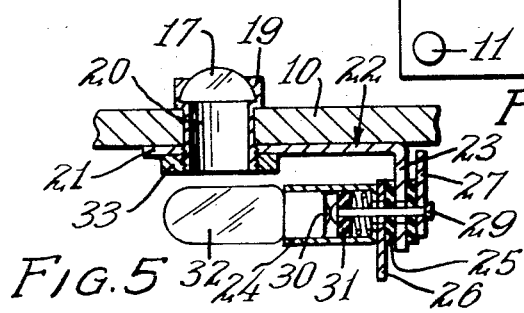
INVENTOR
ROBERT D. VANEK
BY Robert M. Dunning
ATTORNEY United States Patent Office 3,466,760
Patented Sept. 16, 1969

3,466,760
EDUCATIONAL ELECTRICAL CIRCUIT TOY
Robert D. Vanek, 1701 Juliet Ave.,
St. Paul, Minn. 55105
Filed Aug. 8, 1966, Ser. No. 571,023
Int. Cl. G09b 23/18, 23/06
U.S. Cl. 35—19                          2 Claims

ABSTRACT OF THE DISCLOSURE

An educational toy comprising a panel with electrical elements including current supply, light bulbs, switches and terminals therefore capable of being connected by loose connectors to complete various circuits. Representations of rooms of a house are on the panel.

---

This invention relates to an improvement in educational electrical circuit toy and deals particularly with a toy capable of teaching a person the principles of electrical wiring.

Many persons live their entire lives without understanding anything about the principles of electrical circuitry. In many instances, such persons would be completely unable to connect even the simplest electrical circuit. It is an object of the present invention to provide a simple toy, portions of which are pre-wired, and which may teach the principle of simple electrical circuits.

A feature of the present invention resides in the provision of a game board which is partially wired, and which includes a series of representations of various rooms containing electrical components. For example, the game board may include a representation of a residence having a first floor, a basement, and an attic. The game board may also include the representation of a garage. Switches, push buttons, lights and a buzzer are provided in locations where they might be normally considered to be positioned. The game board may also include the representation of a power pole on which batteries are supported to supply a source of power. Each component part such as a light, switch, push button or buzzer is connected between a pair of terminals. By connecting the various terminals through the use of a suitable means such as alligator clips connected by a flexible conductor, various circuits can be formed connecting the line wires leading from the batteries to the various components. By following simple instructions, the components may be electrically connected.

A further feature of the present invention resides in the provision of a game or toy of the type described which may be used to form simple series circuits as for example, connecting the power source through a push button switch to a buzzer, or connecting a light through a light switch to the source of power supply. The same device may be connected to form a parallel circuit such as would be used if a single buzzer were to be operated by either of two pushbutton switches. The apparatus may similarly be used to form a series, parallel circuit such as would be used to turn off a light by means of either of two switches so that the light may be turned off or on from either location. Circuits of this type are commonly used on stairways so that the light may be controlled from either the top or bottom of the stairs.

A further feature of the present invention resides in the provision of a toy of the type described in which the game board includes a diagram of the connection between each component and the terminals associated therewith. For example, each light, pushbutton or switch is located between a pair of terminals, and the board indicates the connection between each component and the terminals.

These and other objects and novel features of the present invention will be more clearly and fully set forth in the following specification and claims.

In the drawings forming a part of the specification
FIGURE 1 is a diagrammatic view of a game board, showing a general arrangement of parts.
FIGURE 2 is a plan view of a connector of the type used to form the various connectors.
FIGURE 3 is a rear plan view of a game board, showing the components mounted thereupon.
FIGURE 4 illustrates diagrammatically a simple series-parallel circuit for controlling a pair of lights from either of two switch locations.
FIGURE 5 is a sectional view through one of the light supporting brackets.

The game board is shown as comprising a rectangular panel of insulating material 10, the panel being made of pressed wood, composition, plastic, wood, or other material. The panel 10 is supported by a plurality of spaced legs 11 designed to rest on a table or other suitable supporting surface. On the surface of the board is represented roughly a rectangular area 12 designed to represent a basement, a rectangular area 13 above the area 12 which is designed to represent the first floor of a house, and a triangular area 14 which is designed to represent the attic of the building. A second generally rectangular area 15 having a slanting upper portion 16 is designed to represent a garage.

There are a series of translucent buttons 17 (see FIGURE 5) mounted in the same board, each representing a light. These structures are commonly used for indicator lights on instrument panels and the like. To simplify the description, one such structure is shown and described; and the remainder of the lights will be merely described by individual identifying numerals.

The translucent bottons 17 may be of different identifying colors. The substantially semi-spherical buttons are mounted in the enlarged diameter ends 19 of hollow sleeves 20 adapted to extend through the panel 10 and through an arm 21 of a light supporting bracket 22. The right angular arm 23 of the bracket 22 is insulated relative to a light bulb socket 24 by an insulation washer 25. A terminal arm 26 is electrically connected to the socket 24, and a second terminal arm 27 is connected to an axial conductor 29 connected to a central contact 30 on an insulation plug 31 slideable in the socket 24. A light bulb such as 32 is mounted in the socket 24. In the following description, the entire assembly will be referred to as a light and will have an identifying numeral. A nut 33 holds the bracket 22 and panel 10 assembled.

It should also be noted that each terminal arm is connected to a pair of terminal posts on opposite sides of the light by a pair of flexible conductors. These terminals may merely comprise bolts extending through the panel. The terminals on opposite sides of the light button will also bear identifying numerals.

A first transparent light is indicated at 34 in the area 14 representing the attic. The light 34 has its terminals connected to fixed terminals which are identified on the front of the panel 10 by the numerals L1 and L2.

A second light 35 extends through the area 13 of the diagram representing the first floor of the building. With reference to FIGURE 3 of the drawings, the light 34 has its terminals connected by conductors to terminals L3 and L4 extending through the panel 10.

In a similar manner, a light 36 extends through the diagram area 12 representing the basement of the house. As is indicated in FIGURE 3 of the drawings, the bulb of this light is connected by suitable conductors to the terminals L5 and L6. A fourth light 37 extends through the panel 10 in the area thereof between the representation of the house and the representation of the garage area 15.

The light 37 has its terminals connected by suitable conductors to the terminals L7 and L8. A fifth light 39 is provided in the area 15 representing the garage. This light is connected by its conductors to terminals L9 and L10. It will be noted that the arrangement is preferably such that the transparent button forming a part of the light is essentially located between the adjoining terminals. It will also be noted from FIGURE 1 of the drawings that the front of the panel is inscribed with lines such as 40 showing the connection between the light bulb terminals and the terminals themselves. As a result, an observation of FIGURE 1 will indicate the light itself and the light terminals and connections therebetween.

A simple push button switch 41 is mounted in the area representing a first floor. The terminals of the switch are connected by suitable flexible conductors or other means to terminals B1 and B2 extending through the panel 10. A similar push button switch 42 is mounted in the area of the board representing the basement, and this switch 42 is shown in FIGURE 3 as being connected to B3 and B4 extending through the game board. The push button switches 41 and 42 are similar to doorbell switches which close the contact when depressed.

A switch 43 is mounted on the panel 10 in the area representing the first floor. This switch 43 is what is commonly known to the trade as a three-way switch such as those used in series-parallel circuits. In other words, the switch is of the single pole, double throw type and the conductors of the switch are connected to suitable terminals S1, S2 and S3 extending through the panel. A similar switch 44 is provided in the area 15 representing the garage. This switch is also of the single pole, double throw type and has its terminals connected to terminals S4, S5 and S6 extending through the panel 10.

The area representing the basement 12 is also provided with an off-on switch 45, the terminals of which are connected to terminal posts S7 and S8 extending through the panel 10.

A buzzer or bell 46 is mounted upon the panel 10 and has its terminals connected to the terminal posts D1 and D2 extending through the panel 10. The panel 10 also supports a pair of battery-holding clips 47 and 49 which support aligned batteries 50. The terminals of the battery are engaged with contacts 51 and 52 which are shown in FIGURE 3 to be connected by conductors 54 and 55 to terminal posts P1 and P2 extending through the panel 10.

Also included in the game are a number of flexible connectors including insulated conductors 56 connected at their ends to alligator clips 57 and 59. The alligator clips 57 and 59 are selectively engageable with any of the terminal posts which have been described. The number of such conductors 56 which are included is sufficient to complete any of the wiring diagrams which have been described.

For the purpose of illustration of the manner in which the game may function, let us consider that the problem is to produce an operable simple series circuit. This may be done in the following manner. A connector 56 is connected from the terminal post P1 to the terminal post B1. A second connector 56 is connected from terminal B2 to the terminal post D2. A third connector 56 is connected from the terminal D1 to the terminal post P2. This completes a circuit from one terminal of the batteries 50 through the push button 41 to the buzzer 46. Accordingly, when the push button 41 is depressed, the buzzer will ring. As an illustration of a parallel circuit, a connector 56 may be used to connect the terminal post B1 to the terminal post B3 and another conductor is used to connect the terminal post B2 to the terminal post B4. This places the two pushbuttons 41 and 42 in parallel, and the buzzer 46 will ring when either of these pushbuttons is actuated.

To connect a single light from a single switch, a conductor 56 is used to connect the terminal post P1 to the terminal post S7. A second conductor 56 is used to connect the terminal post S8 to L1. A third conductor is used to connect the terminal post L2 to the terminal post P2.

With this arrangement, the attic light 34 is turned on by means of the basement switch 45.

The foregoing is another example of a simple series circuit. To make this into another parallel circuit, a connector 56 connects the terminal posts L1 and L3 and another conductor connects the terminal posts L2 and L4. As a result, the first floor light 35 goes on simultaneously with the attic light 34.

If it is desired to control a single light, such as outdoor light 37 from two different locations, a conductor 56 is used to connect the terminal posts P1 to S1. A second conductor connects terminal post S2 to S4. A third connector connects terminal post S3 to S5. A fourth connector connects terminal post S6 to L8. A fifth connector connects the terminal post L7 to P2. This circuit permits the yard light 37 to be turned on either by the switch 43 or by the switch 44. The light 37 may be illuminated by operation of either of the switches regardless of which was last used. Furthermore, the light may be turned off by either switch regardless of that which was previously used.

FIGURE 4 of the drawings describes a circuit much similar to that just described with the exception of the fact that the lights 37 and 39 are secured in series in the circuit. A more common way of operation would be to connect these lights 37 and 39 in parallel so that both lights would receive the proper current. The arrangement illustrated may demonstrate what would take place in a series circuit such as that used on some Christmas tree light circuits. The arrangement would demonstrate the manner in which the current is cut down by placing the lights in series while it would not be cut down visibly if the lights 37 and 39 were placed in parallel.

In accordance with the Patent Office Statutes, I have described the principles of construction and operation of my improvement in educational electrical circuit toy and while I have endeavored to set forth the best embodiment thereof, I desire to have it understood that changes maybe made within the scope of the following claims without departing from the spirit of my invention.

I claim:
1. An educational toy including:
an apertured panel having a front surface and a rear surface and having depicted thereon on its front surface a plurality of areas representing rooms,
a light bulb socket secured to the rear surface of said panel in the area thereof representing each room,
a light bulb in each said socket, said panel having an aperture therethrough forwardly of each said light through which the light bulb is visible when said light bulb is illuminated,
a pair of fixed socket terminals secured to and extending through said panel to extending forwardly therefrom adjoining each said socket,
conductors on the rear side of said panel connecting each said socket in series between a pair or socket terminals,
a switch supported extending through said panel in each of said areas and manually operable from the front side thereof,
a pair of fixed switch terminals extending through said panel adjoining each said switch,
conductors connecting said switches in series between said fixed switch terminals,
a pair of fixed power terminals extending through said panel adjoining said plurality of areas to extend forwardly therefrom,
conductor means on the rear side of said panel leading to a supply of current,
a series of flexible conductors having clips at opposite ends thereof engageable with any of said fixed terminals extending through said panel
whereby said flexible conductors may connect any said light in series with said current supply and a corresponding switch, the flexible conductors being on the front of said panel while the permanent conductors are on the rear side thereof.

2. The structure of claim 1 and including as a component a doorbell mounted on said panel,
- a pair of fixed doorbell terminals extending through said panel adjoining said doorbell and connected to said doorbell by conductors on the rear side of said panel,
- a doorbell switch mounted on said panel and operable manually from the forward side of said panel,
- fixed doorbell switch terminals extending through said panel and connected by conductors on the rear side of said panel to the doorbell switch terminals, flexible conductors having clips at opposite ends thereof for connecting said power terminals in series with said doorbell and doorbell switch.

References Cited
UNITED STATES PATENTS

| | | | |
|---|---|---|---|
| 1,271,641 | 7/1918 | Werwath | 35—19 |
| 2,878,587 | 3/1959 | Jubenville | 35—19 |
| 3,237,318 | 3/1966 | Schager | 35—10 |

EUGENE R. CAPOZIO, Primary Examiner

H. S. SKOGQUIST, Assistant Examiner